(12) United States Patent
Reiche et al.

(10) Patent No.: US 8,367,231 B2
(45) Date of Patent: Feb. 5, 2013

(54) POLYMER ELECTROLYTE MEMBRANE WITH FUNCTIONALIZED NANOPARTICLES

(75) Inventors: Annette Reiche, Göttingen (DE); Dieter Melzner, Göttingen (DE); Ulrich Mähr, Berlin (DE); Oliver Gronwald, Frankfurt (DE); Werner Obrecht, Moers (DE); Thomas Früh, Mutterstadt (DE); Torsten Ziser, Weinhum (DE)

(73) Assignees: Elcomax Membranes GmbH (DE); Rhein Chemie Rheinau GmbH (DE); Lanxess Deutschland GmbH (DE)

( * ) Notice: Subject to any disclaimer, the term of this patent is extended or adjusted under 35 U.S.C. 154(b) by 444 days.

(21) Appl. No.: 12/555,021

(22) Filed: Sep. 8, 2009

(65) Prior Publication Data

US 2010/0068593 A1 Mar. 18, 2010

Related U.S. Application Data

(63) Continuation of application No. PCT/EP2008/001803, filed on Mar. 6, 2008.

(30) Foreign Application Priority Data

Mar. 8, 2007 (DE) .................. 10 2007 011 424

(51) Int. Cl.
*H01M 8/10* (2006.01)
(52) U.S. Cl. ............. 429/33; 429/30; 264/101; 264/104
(58) Field of Classification Search ............... 429/33, 429/30; 264/101, 104
See application file for complete search history.

(56) References Cited

U.S. PATENT DOCUMENTS

| | | | |
|---|---|---|---|
| 2,187,146 A | 1/1940 | Calcott et al. | |
| 5,302,696 A | 4/1994 | Schiessl | |
| 5,442,009 A | 8/1995 | Parker et al. | |
| 6,399,706 B1 | 6/2002 | Obrecht et al. | |
| 7,682,722 B2 * | 3/2010 | Melzner et al. | ............... 429/480 |
| 2002/0093008 A1 * | 7/2002 | Kerres et al. | ............... 252/500 |
| 2005/0182158 A1 | 8/2005 | Ziser et al. | |

(Continued)

FOREIGN PATENT DOCUMENTS

| | | |
|---|---|---|
| DE | 19919988 | 11/2000 |
| DE | 10205849 | 8/2003 |

(Continued)

OTHER PUBLICATIONS

H.G. Muller, "Automated determination of particle-size distributions of dispersions by analytical ultracentrifugation", Colloid & Polymer Science, vol. 267, No. 12, pp. 1113-1116 (1989).

(Continued)

*Primary Examiner* — Peter D. Mulcahy
*Assistant Examiner* — Henry Hu
(74) *Attorney, Agent, or Firm* — Myers Wolin, LLC

(57) ABSTRACT

The present invention relates to a polymer electrolyte membrane for fuel cells, comprising a polymer matrix of at least one basic polymer and one or more doping agents, wherein particles containing ionogenic groups and having a mean particle diameter in the nanometer range are embedded in the polymer matrix and the particles containing ionogenic groups are distributed homogeneously in the polymer matrix in a concentration of less than 50% relative to the weight of the polymer matrix, as well as to the production and use of same, especially in high-temperature fuel cells.

16 Claims, 2 Drawing Sheets

DMA Measurements

U.S. PATENT DOCUMENTS

| | | |
|---|---|---|
| 2005/0197443 A1 | 9/2005 | Ziser et al. |
| 2006/0199059 A1* | 9/2006 | Xu .................................. 429/30 |
| 2007/0232733 A1 | 10/2007 | Ziser et al. |
| 2008/0064768 A1 | 3/2008 | Ziser et al. |

FOREIGN PATENT DOCUMENTS

| | | |
|---|---|---|
| DE | 102004009396 | 9/2005 |
| WO | 03/063266 | 7/2003 |
| WO | 03/081691 | 10/2003 |
| WO | 2004/005380 | 1/2004 |
| WO | WO-2004/005380 A1 * | 1/2004 |
| WO | 2005/030843 | 4/2005 |
| WO | 2005/033186 | 4/2005 |

OTHER PUBLICATIONS

International Search Report for corresponding International Application No. PCT/EP2008/001803, date of mailing date of Jul. 3, 2008.

* cited by examiner

Long-term stability of an inventive polymer membrane based on microgel OBR 1290-4 in the membrane-electrode unit of a fuel cell

POLYMER ELECTROLYTE MEMBRANE WITH FUNCTIONALIZED NANOPARTICLES

This application is a continuation application of International Application No. PCT/EP2008/001803, filed on Mar. 6, 2008, now pending, which claims priority to German Patent Application No. 10 2007 011 424.0, filed on Mar. 8, 2007, the entire contents of each of which are incorporated herein by reference.

The present invention relates to a polymer electrolyte membrane for fuel cells, comprising a polymer matrix of at least one basic polymer and one or more doping agents, wherein particles containing ionogenic groups and having a mean particle diameter in the nanometer range are embedded in the polymer matrix and the particles containing ionogenic groups are distributed homogeneously in the polymer matrix in a concentration of less than 50% relative to the weight of the polymer matrix, as well as to the production and use of same, especially in high-temperature fuel cells.

Polymer electrolyte membranes, for example of the Nafion type, which are based on polymers containing perfluorinated sulfonic acid groups, are known in the prior art. Because charge transport in these membranes is contingent on the presence of water, however, the operating range of corresponding polymer electrolyte membrane fuel cells is limited to a maximum of 100° C. In order to achieve a higher operating temperature, membranes provided with inorganic particles have been proposed for fuel cells (see DE 19919988 A1, DE 10205849 A1, WO 03/063266 A2 and WO 03/081691 A2). Membranes using another kind of particles for fuel cells have not been known heretofore.

DE 102004009396 A1 describes membranes for fuel cells with improved electrical, mechanical and thermal properties in fuel-cell operation. These membranes are composed of a polymer, particularly preferably a plastic, a natural substance, silicone or rubber, and of a proton-conducting substance. However, such membranes do not exhibit any industrially significant conductivities at room temperature and have poor mechanical stability.

The object of the present invention is therefore to provide a polymer membrane for fuel cells that is designed to have improved conductivity at room temperature and high long-term stability in fuel-cell operation. Another object is a polymer membrane for fuel cells that is designed to operate efficiently for a long time at a high operating temperature in fuel cells and to have high proton conductivity, without losing substantial amounts of the components responsible for proton conduction during operation in a fuel cell.

This technical object is achieved by provision of the embodiments characterized in the claims.

In particular, according to the present invention, there is provided a polymer electrolyte membrane for fuel cells comprising a polymer matrix of at least one basic polymer and one or more doping agents, wherein particles containing ionogenic groups and having a mean particle diameter in the nanometer range are embedded in the polymer matrix and the particles containing ionogenic groups are distributed homogeneously in the polymer matrix in a concentration of less than 50% relative to the weight of the polymer matrix.

In the inventive polymer electrolyte membrane, the particles containing ionogenic groups are distributed homogeneously in the polymer matrix in a concentration of less than 50% relative to the weight of the polymer matrix. Thereby it is ensured that the particles present in the matrix and containing ionogenic groups are substantially not in contact with one another and are surrounded by matrix-forming polymer. According to a preferred embodiment of the inventive polymer electrolyte membrane, the particles containing ionogenic groups are distributed homogeneously in the polymer matrix in a concentration of less than 40%, particularly preferably 10 to 30%, relative to the weight of the polymer matrix.

According to the present invention, particles containing ionogenic groups are to be understood in particular as oligomeric and/or polymeric particles, which may but do not necessarily have to exhibit a solid phase boundary with the surrounding polymer matrix. A substantial property of the particles containing ionogenic groups is especially that they are not lost from the polymer matrix or polymer electrolyte membrane in the manner, for example, of low molecular weight proton-conducting components. Suitable particles containing ionogenic groups are in particular all organic particles composed mainly of one or more organic polymer(s) and/or oligomer(s). In principle, the polymers or oligomers suitable for the organic particles containing ionogenic groups are not subject to any substantial restriction. Nevertheless, it is preferred that the particles containing ionogenic groups are composed mainly of a rubber-like polymer or oligomer or of a non-rubber-like polymer or oligomer, preferably a thermoplastic polymer or oligomer. The particles containing ionogenic groups may be of oligomeric and/or polymeric nature.

As an example, the particles containing ionogenic groups may be composed mainly of base monomers having at least one polymerizable or copolymerizable group, preferably at least two and particularly preferably two to four polymerizable or copolymerizable groups, especially C=C double bonds.

Examples of suitable base monomers, which preferably contain one to four polymerizable or copolymerizable group(s), are butadiene, styrene, acrylonitrile, isoprene, esters of acrylic and methacrylic acid, tetrafluoroethylene, vinylidene fluoride, hexafluoropropene, 2-chlorobutadiene, 2,3-dichlorobutadiene, double-bond-containing carboxylic acids, such as acrylic acid, methacrylic acid, maleic acid or itaconic acid, double-bond-containing sulfonic acids, double-bond-containing phosphonic acids, double-bond-containing hydroxy compounds, such as hydroxyethyl methacrylate, hydroxyethyl acrylate or hydroxybutyl methacrylate, amine-functionalized (meth)acrylates, diisopropenylbenzene, divinylbenzene, divinyl ether, divinyl sulfone, diallyl phthalate, triallyl cyanurate, triallyl isocyanurate, 1,2-polybutadiene, N,N'-m-phenylene maleimide, 2,4-toluoylenebis(maleimide) and/or triallyl trimellitate. Base monomers with two to four polymerizable or copolymerizable groups are chosen in particular when efficient cross-linking is desired. Furthermore, the particles containing ionogenic groups may be composed mainly of acrylates and/or methacrylates of preferably polyhydric, particularly preferably dihydric to tetrahydric alcohols, such as ethylene glycol, 1,2-propanediol, butanediol, hexanediol, polyethylene glycol with 2 to 20, preferably 2 to 8 oxyethylene units, neopentyl glycol, bisphenol A, glycerol, trimethylolpropane, pentaerythritol or sorbitol with unsaturated polyesters of aliphatic diols and polyols, and maleic acid, fumaric acid and/or itaconic acid or mixtures thereof.

Examples of suitable base monomers are in particular the following compounds:

Vinylcarbazole, N-vinyl-1-pyrrolidone, N-allylurea, N-allylthiourea, secondary amino-(meth)-acrylic acid esters, such as 2-tert-butylaminoethyl methacrylate, 2-tert-butylaminoethyl methacrylamide, dimethylaminopropyl methacrylamide, 2-dimethylaminoethyl methacrylate, vinylimidazole, such as 1-vinylimidazole, vinylpyridine, such as 2-vinylpyridine and 4-vinylpyridine, acrylamide, 2-acrylamidoglycolic acid, 2-acrylamido-2-methyl-1-propanesulfonic acid, acrylic acid [2-(((butylamino)-(carbonyl)oxyl)ethyl ester], acrylic acid 2-(diethylamino)ethyl ester, acrylic acid 2-(dimethylamino) ethyl ester, acrylic acid 3-(dimethylamino)propyl ester, acrylic acid isopropylamide, acrylic acid phenylamide, acrylic acid 3-sulfopropyl ester potassium salt, methacrylic acid amide, methacrylic acid 2-aminoethyl ester hydrochloride, methacrylic acid 2-(tert-butylamino)ethyl ester, methacrylic acid 2-(dimethylamino)methyl ester, methacrylic acid 3-(dimethylamino)propylamide, methacrylic acid isopropylamide, methacrylic acid 3-sulfopropyl ester potassium salt, 3-vinylaniline, 4-vinylaniline, N-vinylcaprolactam, N-vinylformamide, 1-vinyl-2-pyrrolidone, 5-vinyluracil.

According to a preferred embodiment, the particles containing ionogenic groups have ionogenic groups on the surface or in the entire particles. Furthermore, it is also possible to use functional groups that can be transformed to ionogenic groups, preferably acid groups, after a chemical reaction, such as a deprotection reaction, a hydrolysis, an addition reaction or a substitution reaction.

The ionogenic groups can be introduced, especially at the surface of the particles, by making reagents that are reactive in particular with C=C double bonds react chemically with reactive groups present at the surface of a cross-linked or pre-cross-linked polymer or oligomer particle. Examples of reagents that can be reacted with reactive groups present at the surface of a cross-linked or pre-cross-linked particle, especially with C=C double bonds, are aldehydes, hydroxy compounds, carboxyl compounds, nitrile compounds, sulfur compounds, such as compounds with mercapto, dithiocarbamate, polysulfide, xanthogenate, thiobenorthiazole and/or dithiophosphonic acid groups, unsaturated carboxylic acids or dicarboxylic acids, unsaturated sulfonic acids, unsaturated phosphonic acids, N,N'-m-phenylenediamine, acrylic acid, methacrylic acid, hydroxyethyl methacrylate, hydroxyethyl acrylate, hydroxybutyl methacrylate, acrylamide, methacrylamide, amine-functionalized (meth)acrylates, such as acrylonitrile, acrolein, N-vinyl-2-pyrrolidone, N-allylurea and N-allylthiourea, and derivatives and mixtures thereof.

Preferably the particles containing ionogenic groups are functionalized at the surface or in the entire particles by ionogenic groups, particularly preferably by covalently bonded acid groups, such as acid groups of monobasic or polybasic acids, acid groups of polybasic acids being particularly preferred. The acid groups bonded covalently at the surface or in the entire particles are preferably carboxylic acid, sulfonic acid, phosphonic acid and/or phosphoric acid groups with one or more acid group(s). However, it is also possible to use other acid groups with similar acidity or functional groups that can be transformed to acid groups. According to a particularly preferred embodiment, the ionogenic groups are selected from one or more of the following functional groups: —COOH, —SO$_3$H, —OSO$_3$H, —P(O)(OH)$_2$, —O—P(OH)$_2$ and —O—P(O)(OH)$_2$ and/or salts thereof and/or derivatives thereof, especially partial esters thereof. The salts represent the conjugate bases to the acid functional groups, or in other words —COO$^-$, —SO$_3^-$, —OSO$_3^-$, —P(O)$_2$(OH)$^-$ or —P(O)$_3^{3-}$, —O—P(O)$_2^{2-}$ and —OP(O)$_2$(OH)$^-$ or —OP(O)$_3^{2-}$ in the form of their metal salts, preferably alkali metal or ammonium salts.

Consequently, the particles containing ionogenic groups may have ionogenic groups at the surface of the particles and form a core-shell type of structure or may contain ionogenic groups in substantially the entire particle, in which case they are functionalized almost homogeneously or throughout.

The ionogenic groups described in the foregoing may be introduced at the surface or in the entire particle by different methods.

However, it is preferable to form particles containing ionogenic groups by copolymerization of at least one of the foregoing base monomers in the presence of at least one monomer having ionogenic groups, preferably acid groups. By this method, which may also be referred to as a one-stage method, it is possible to obtain particles containing not only oligomeric but also polymeric ionogenic groups. Copolymerization in a homogeneous phase, such as in solution or in bulk, is particularly suitable for formation of particles containing oligomeric ionogenic groups with the foregoing ionogenic groups in the entire particle. In the case of copolymerization by emulsion polymerization, for example, or in other words by using an emulsion of a monomer or monomer mixture in water, for example, it is possible to produce in particular particles containing polymeric ionogenic groups, wherein the ionogenic groups are localized preferably on the microgel surface. However, it is also possible to assemble an oligomeric or polymeric particle by starting from a base monomer having suitable ionogenic groups, preferably acid groups or groups that can be transformed to acid groups.

For example, it is conceivable, in order to create protein-conducting properties in particular, firstly to obtain an oligomeric or polymeric particle by cross-linking a base monomer containing groups that can be transformed to acid groups, and only thereafter to form the desired ionogenic groups at the surface of the particle by chemical modification, for example by a deprotection reaction, a hydrolysis, an addition reaction or a substitution reaction.

Furthermore, it is preferable firstly to cross-link at least one of the foregoing base monomers in such a way that an oligomer, prepolymer or polymer particle is formed, and thereafter to graft at least one monomer having ionogenic groups, preferably acid groups, onto the surface of this particle, in order to form a structure of the core-shell type. According to this procedure, which corresponds to a two-stage method, particles containing oligomeric or polymeric ionogenic groups can be produced wherein the ionogenic groups are present substantially only on the surface or in a zone near the surface. The procedure in a homogeneous phase, for example in solution or in bulk, is suitable in particular for the formation of particles containing oligomeric ionogenic groups, and the procedure of emulsion polymerization is suitable in particular for the production of particles containing polymeric ionogenic groups. In this connection it is preferable that grafting of a monomer with ionogenic groups achieves a high degree of coverage with the ionogenic groups on the surface of the particle. Preferably the surface of the particle containing ionogenic groups is functionalized almost quantitatively with ionogenic groups, preferably acid groups, which means that substantially every reactive group present on the surface of a cross-linked or pre-cross-linked particle has reacted with a monomer having ionogenic groups.

According to a preferred embodiment, the monomers having ionogenic groups are monomers having acid groups, such as (meth)acrylic acid, maleic acid, vinylsulfonic acid, vinylphosphonic acid and/or styrenesulfonic acid, as well as derivatives and mixtures thereof. According to a particularly preferred embodiment, the ionogenic groups are selected from one or more of the following functional groups: —COOH, —SO$_3$H, —OSO$_3$H, —P(O)(OH)$_2$, —O—P(OH)$_2$ and —O—P(O)(OH)$_2$ and/or salts thereof and/or derivatives thereof, especially partial esters thereof. The salts represent the conjugate bases to the acid functional groups, or in other words —COO$^-$, —SO$_3^-$, —OSO$_3^-$, —P(O)$_2$(OH)$^-$ or —P(O)$_3^{3-}$, —O—P(O)$_2^{2-}$ and —OP(O)$_2$(OH)$^-$ or –OP(O)$_3^{2-}$ in the form of their metal salts, preferably alkali metal or aluminum salts.

According to a preferred embodiment, the particles containing ionogenic groups are organic polymers and/or oligomers produced from at least polystyrene and vinylsulfonic acid.

The formation of the particles containing ionogenic groups by polymerization or copolymerization is achieved by standard methods, for example thermal, photochemical or radical methods, if necessary with addition of a radical starter of the peroxide type or azo type. Suitable radical starters of the peroxide type or azo type are known to those skilled in the pertinent art and can be selected as appropriate.

In principle, the particle size of the particles containing ionogenic groups is not subjected to any substantial restriction, as long as it falls within the nanometer range. The particles containing ionogenic groups preferably have a mean particle diameter in a range of 5 nm to 500 nm, a range of 20 nm to 400 nm being particularly preferred and a range of 30 nm to 300 nm being most particularly preferred.

When the particles containing ionogenic groups are of polymeric nature, they may exhibit a solid phase boundary with the surrounding polymer matrix. However, it is also possible that they do not exhibit any solid phase boundary with the surrounding polymer matrix. The particle size of such polymers, which may also be referred to as microgels, lies preferably in a range of approximately 40 nm to approximately 200 nm. These particles containing ionogenic groups are preferably produced by emulsion polymerization.

Emulsion polymerization within the meaning of the present invention is to be understood in particular as a method known in itself, wherein water is used as the reaction medium, in which the monomers used are polymerized in the presence of emulsifiers and radical-forming substances to form aqueous polymer latices (see, among other references, Römpp Lexicon of Chemistry, Volume 2, 10$^{th}$ Edition 1997; P. A. Lovell, M. S. El-Aasser, Emulsion Polymerization and Emulsion Polymers, John Wiley & Sons, ISBN: 0471967467; H. Gerrens, Fortschr. Hochpolym. Forsch. 1, 234 (1959)). In contrast to suspension or dispersion polymerization, emulsion polymerization usually yields finer particles, thus permitting a smaller particle spacing in a matrix. The finer particles, with their small mean diameter, are smaller than the critical defect size, and so they subject the matrix containing them to only slight mechanical impairments while having a corresponding degree of dispersion.

The choice of monomers is used to adjust the glass transition temperature and the glass transition interval of the polymer particles. The glass transition temperature (Tg) and the glass transition interval (ΔTg) of the microgels or of the substantially spherical polymer particles are determined by differential scanning calorimetry (DSC), preferably as described hereinafter. For this purpose, two cooling/heating cycles are performed for the determination of Tg and ΔTg. Tg and ΔTg are determined in the second heating cycle. For the determinations, approximately 10-12 mg of the selected microgel is placed in a DSC sample holder (standard aluminum pan) of Perkin-Elmer. The first DSC cycle is performed by cooling the sample first with liquid nitrogen to −100° C. and then heating to +150° C. at a rate of 20K/min. The second DSC cycle is begun by cooling the sample immediately, as soon as a sample temperature of +150° C. has been reached. Cooling is achieved by rapid cooling with liquid nitrogen. In the second heating cycle, the sample is heated to +150° C. once again, as in the first cycle. The heating rate in the second cycle is again 20K/min. Tg and ΔTg are determined graphically on the DSC curve of the second heating operation. For this purpose, three lines are fitted to the DSC curve. The first line is constructed along the curve part of the DSC curve below Tg, the second line is constructed along the curve branch with inflection point passing through Tg, and the third line is constructed along the curve branch of the DSC curve above Tg. In this way three lines with two points of intersection are obtained. Each of the two points of intersection represents a characteristic temperature. The glass transition temperature Tg is obtained as the mean value of these two temperatures, and the glass transition interval ΔTg is obtained from the difference between the two temperatures.

Rubber-like polymer particles exhibit a glass temperature of generally lower than 23° C. Thermoplastic polymer particles generally have a glass transition temperature higher than 23° C.

For the polymer particles used according to the invention, the glass transition interval is preferably broader than 5° C., preferably broader than 10° C.

Rubber-like polymer particles are preferably particles based on conjugated dienes, such as butadiene, isoprene, 2-chlorobutadiene and 2,3-dichlorobutadiene, as well as ethene, esters of acrylic and methacrylic acid, vinyl acetate, styrene or derivatives thereof, acrylonitrile, acrylamides, methacrylamides, tetrafluoroethylene, vinylidene fluoride, hexafluoropropene, double-bond-containing hydroxy compounds, such as hydroxyethyl methacrylate, hydroxyethyl acrylate, hydroxypropyl acrylate, hydroxybutyl methacrylate, acrolein or combinations thereof.

Preferred monomers or monomer combinations include: butadiene, isoprene, acrylonitrile, styrene, α-methylstyrene, chloroprene, 2,3-dichlorobutadiene, butyl acrylate, 2-ethylhexyl acrylate, hydroxyethyl methacrylate, tetrafluoroethylene, vinylidene fluoride and hexafluoropropene.

Here, "based on" means that preferably more than 60 wt % of the polymer particles consists of the cited monomers, preferably more than 70 wt % and more preferably more than 90 wt %.

The polymer particles may be cross-linked or non-cross-linked. Cross-linked polymer particles are also referred to as microgels or substantially spherical polymer particles. In particular, the polymer particles may be particles based on homopolymers or statistical copolymers. The terms homopolymers and statistical copolymers are known to those skilled in the art and, for example, are explained in Vollmert, Polymer Chemistry, Springer Verlag 1973.

As the polymer base of the rubber-like, cross-linked or non-cross-linked particles containing ionogenic groups there can be used in particular:
BR: polybutadiene,
ABR: butadiene/acrylic acid $C_{1-4}$-alkyl ester copolymers,
IR: polyisoprene,
SBR: statistical styrene-butadiene copolymers with styrene contents of 1-60, preferably 5-50 weight percent,
FKM: fluoro rubber,
ACM: acrylate rubber,
NBR: polybutadiene-acrylonitrile copolymers with acrylonitrile contents of 5-60, preferably 10-60 weight percent,
CR: polychloroprene,
EAM: ethylene/acrylate copolymers,
EVM: ethylene/vinyl acetate copolymers.

Inventive, non-rubber-like, especially thermoplastic polymer particles expediently have a glass transition temperature Tg higher than 23° C. For the thermoplastic polymer particles, the glass transition interval is preferably broader than 5° C. (where Tg or the glass transition interval is determined as described hereinabove). Non-rubber-like, especially thermoplastic polymer particles are preferably particles based on methacrylates, especially methyl methacrylate, styrene or styrene derivatives, such as α-methylstyrene, para-methylstyrene, acrylonitrile, methacrylonitrile, vinylcarbazole or combinations thereof. Here, "based on" means that preferably more than 60 wt % of the polymer particles consists of the cited monomers, preferably more than 70 wt % and more preferably more than 90 wt %.

More preferred thermoplastic polymer particles are particles based on methacrylates, especially methyl methacrylate, styrene, α-methylstyrene and acrylonitrile.

The polymer particles preferably have an approximately spherical geometry.

The polymer particles used according to the invention preferably have a mean particle diameter in the range of 5 nm to 500 nm, particularly preferably of 20 nm to 400 nm, most preferably of 30 nm to 300 nm. The mean particle diameter is determined by means of ultracentrifugation with the aqueous latex of the polymer particles from the emulsion polymerization. The method yields a mean value for the particle diameter that allows for the possible presence of agglomerates (H. G. Müller (1996) Colloid Polymer Science 267; 1113-1116 as well as W. Scholtan, H. Lange (1972) Kolloid-Z and Z Polymere 250: 782). Ultracentrifugation has the advantage that the entire particle-size distribution is characterized and different mean values such as number-average mean and weight-average mean can be calculated from the distribution curve.

The mean diameter data used according to the invention relate to the weight-average mean.

Hereinafter diameter parameters such as $d_{10}$, $d_{50}$ and $d_{80}$ will be used. These parameters mean that 10, 50 and 80 wt % respectively of the particles have a diameter smaller than the corresponding numerical value in "nm".

The determination of diameter by means of dynamic light scattering leads in a first approximation to comparable mean particle diameters. It is also performed on the latex. Lasers operating at 633 nm (red) and 532 nm (green) are commonly used. In contrast to ultracentrifugation, dynamic light scattering yields not the entire particle-size distribution but instead a mean value in which large particles are weighted disproportionately.

The polymer particles used according to the invention preferably have a weight-average mean particle diameter in the range of 5 nm to 500 nm, preferably of 20 nm to 400 nm, particularly preferably of 30 nm to 300 nm.

The inventive particles containing ionogenic groups can be produced by emulsion polymerization, in which case the particle size is adjusted within a wide diameter range by variation of the starting materials, such as emulsifier concentration, initiator concentration, liquor ratio of organic to aqueous phase, ratio of hydrophilic to hydrophobic monomers, amount of cross-linking monomers, polymerization temperature, etc.

After the polymerization, the latices can be treated by vacuum distillation or by treatment with superheated steam, in order to separate volatile components, especially unreacted monomers.

The polymer particles produced in this way can be further processed, for example by evaporation, by electrolyte coagulation, by co-coagulation with a further latex polymer, by freeze-coagulation (see U.S. Pat. No. 2,187,146) or by spray drying.

In a preferred embodiment, the particles containing ionogenic groups and produced by emulsion polymerization are at least partly cross-linked.

Cross-linking of the particles containing ionogenic groups and produced by emulsion polymerization is achieved preferably by the addition of polyfunctional monomers during polymerization, such as by the addition of compounds having at least two, preferably 2 to 4 copolymerizable C=C double bonds, such as diisopropenylbenzene, divinylbenzene, divinyl ether, divinylsulfone, diallyl phthalate, triallyl cyanurate, triallyl isocyanurate, 1,2-polybutadiene, N,N'-m-phenylene maleimide, 2,4-tolulenebis(maleimide), triallyl trimellitate, acrylates and methacrylates of polyhydric, preferably dihydric to tetrahydric $C_{2-10}$ alcohols, such as ethylene glycol, 1,2-propanediol, butanediol, hexanediol, polyethylene glycol having 2 to 20, preferably 2 to 8 oxyethylene units, neopentyl glycol, bisphenol A, glycerol, trimethylolpropane, pentaerythritol, sorbitol as well as unsaturated polyesters from aliphatic diols and polyols and maleic acid, fumaric acid and/or itaconic acid.

Cross-linking of the polymer particles containing ionogenic groups may be achieved directly during emulsion polymerization, such as by copolymerization with cross-linking multifunctional compounds or by subsequent cross-linking as described hereinafter. Direct cross-linking during emulsion polymerization is preferred. Preferred multifunctional comonomers are compounds having at least two, preferably 2 to 4 copolymerizable C=C double bonds, such as diisopropenylbenzene, divinylbenzene, divinyl ether, divinylsulfone, diallyl phthalate, triallyl cyanurate, triallyl isocyanurate, 1,2-polybutadiene, N,N'-m-phenylene maleimide, 2,4-tolulenebis(maleimide) and/or triallyl trimellitate. Other compounds that come into consideration are the acrylates and methacrylates of polyhydric, preferably dihydric to tetrahydric $C_{2-10}$ alcohols, such as ethylene glycol, 1,2-propanediol, butanediol, hexanediol, polyethylene glycol having 2 to 20, preferably 2 to 8 oxyethylene units, neopentyl glycol, bisphenol A, glycerol, trimethylolpropane, pentaerythritol, sorbitol with unsaturated polyesters of aliphatic diols and polyols as well as maleic acid, fumaric acid and/or itaconic acid.

Cross-linking during emulsion polymerization may also take place by prolonging the polymerization up to high conversions or, in the monomer-feed method, by polymerization with high internal conversions. Another possibility also consists in performing the emulsion polymerization in the absence of regulators.

For cross-linking of the non-cross-linked or weakly cross-linked polymer particles following emulsion polymerization, it is best to use the latices that are obtained during emulsion polymerization.

Examples of suitable cross-linking chemicals are organic peroxides, such as dicumyl peroxide, t-butyl cumyl peroxide, bis(t-butylperoxyisopropyl)benzene, di-t-butyl peroxide, 2,5-dimethylhexane-2,5-dihydroperoxide, 2,5-dimethylhexyne-3,2,5-dihydroperoxide, dibenzoyl peroxide, bis-(2,4-dichlorobenzoyl) peroxide, t-butyl perbenzoate as well as organic azo compounds, such as azobisisobutyronitrile and azobiscyclohexanenitrile as well as dimercapto and polymercapto compounds, such as dimercaptoethane, 1,6-dimercaptohexane, 1,3,5-trimercaptotriazine and mercapto-terminated polysulfide rubbers, such as mercapto-terminated reaction products of bis-chloroethyl formal with sodium polysulfide.

The optimal temperature for performing post-cross-linking naturally depends on the reactivity of the cross-linking agent, and it may range from temperatures such as room temperature to approximately 180° C., if necessary at elevated pressure (in this regard see Houben-Weyl, Methods of Organic Chemistry, 4$^{th}$ Edition, Volume 14/2, page 848). Particularly preferred cross-linking agents are peroxides.

Cross-linking of rubbers containing C=C double bonds to microgels may also be achieved in dispersion or emulsion with simultaneous, partial or if necessary complete hydrogenation of the C=C double bond, as described in U.S. Pat. No.

5,302,696 or U.S. Pat. No. 5,442,009 or if necessary other hydrogenating agents, such as organometal hydride complexes.

If necessary, particle growth by agglomeration may be performed before, during or after post-cross-linking.

The polymer particles containing cross-linked ionogenic groups and used according to the invention expediently have toluene-insoluble fractions (gel content) at 23° C. of at least approximately 70 wt %, more preferably at least approximately 80 wt %, even more preferably at least approximately 90 wt %. This toluene-insoluble fraction is determined in toluene at 23°. For this purpose, 250 mg of the polymer particles is swollen for 24 hours with shaking in 25 mL toluene at 23° C. After centrifugation at 20000 rpm, the insoluble fraction is separated and dried. The gel content is obtained from the quotient of the dried residue and the initial weight and is reported in weight percent.

The polymer particles containing cross-linked ionogenic groups and used according to the invention further expediently have a swelling index in toluene at 23° C. of less than approximately 80, more preferably of less than 60, even more preferably of less than 40. Thus the swelling indices (Qi) of the polymer particles may lie particularly preferably between 1-15 and 1-10. The swelling index is calculated from the weight of the solvent-containing polymer particles swollen in toluene for 24 hours at 23° C. (after centrifugation at 20000 rpm) and the weight of the dried polymer particles:

$Qi$=wet weight of the polymer particles/dry weight of the polymer particles.

To determine the swelling index, 250 mg of the polymer particles is allowed to swell for 24 hours with shaking in 25 mL toluene. The gel is centrifuged off and weighed, then dried to constant weight at 70° C. and weighed once again.

The polymer particles containing ionogenic groups and used according to the invention contain ionogenic groups that are ionic or are capable of forming ionic groups. In this way they are capable of being proton-donating and/or proton-accepting.

According to a preferred embodiment, the ionogenic groups are acid groups. According to a particularly preferred embodiment, the ionogenic groups are selected from one or more of the following functional groups: —COOH, —SO$_3$H, —OSO$_3$H, —P(O)(OH)$_2$, —O—P(OH)$_2$ and —O—P(O)(OH)$_2$ and/or salts thereof and/or derivatives thereof, especially partial esters thereof. The salts represent the conjugate bases to the acid functional groups, or in other words —COO$^-$, —SO$_3^-$, —OSO$_3^-$, —P(O)$_2$(OH)$^-$ or —P(O)$_3^{3-}$, —O—P(O)$_2^{2-}$ and —OP(O)$_2$(OH)$^-$ or —OP(O)$_3^{2-}$ in the form of their metal salts, preferably alkali metal or ammonium salts.

According to the invention, particularly preferred ionogenic groups within the meaning of the invention are selected from —SO$_3$H, —PO(OH)$_2$, —O—P(O)(OH)$_2$ and/or salts thereof and/or derivatives thereof, especially partial esters thereof.

Depending on the production technique, the ionogenic groups may be located on the surface and/or not on the surface.

The ionogenic groups may be introduced into the polymer particles by incorporation of functionalized monomers during polymerization and/or by modification after polymerization.

As examples, functionalized monomers are selected from the group consisting of: acrylic acid, methacrylic acid, vinylbenzoic acid, itaconic acid, maleic acid, fumaric acid, crotonic acid, vinylsulfonic acid, styrenesulfonic acid, monomers containing phosphonic acid or phosphoric acid groups and having polymerizable C=C double bonds, such as vinylphosphonic acid, 2-phosphonomethylacrylic acid and 2-phosphonomethylacrylic acid amide, phosphonic acid or phosphoric acid esters of hydroxyfunctional monomers having polymerizable C=C double bonds or salts or derivatives thereof.

Phosphoric acid esters of hydroxyfunctional monomers having polymerizable C=C double bonds preferably have the following formulas (I) or (II) of the following methacrylate compounds:

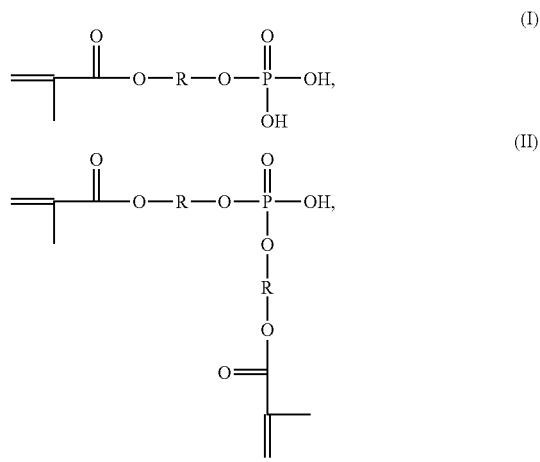

in which R is a divalent organic group, especially such as C$_{1-10}$ alkylene. Preferably R is a C$_{2-4}$ alkylene group (or in other words a C$_{2-4}$ alkandiyl group), such as an ethylene or an n-propylene group. Salts of these compounds are also usable, especially such as alkali metal salts, preferably the sodium salt or ammonium salts. The corresponding acrylates are also usable. Furthermore, partial esters with other saturated or unsaturated carboxylic acids of these compounds may be used. According to the invention, the term partial ester includes both the case that some of the acid hydroxyl groups of the ionogenic group are partly esterified and the case in which some of the hydroxyl groups in the polymer particles are esterified while others are not esterified.

The proportion of the functional monomers incorporated by polymerization and containing ionogenic groups is preferably 0.1 to 100 wt %, more preferably 0.2 to 99.5 wt % relative to the total amount of monomers. This means that homopolymers of these monomers containing ionogenic groups may also be used. For example, at least 10 wt %, at least 20 wt % or at least 30 wt % of these monomers may be present.

As an example, the ionogenic groups —OSO$_3$H and —OP(O)(OH)$_2$ may also be introduced into the polymer particles by reaction of hydroxyl-modified polymer particles (such as obtained by incorporation of hydroxyalkyl(meth)acrylates by polymerization) or by addition of sulfuric or phosphoric acid to epoxy-containing (for example, glycidyl methacrylate-containing) polymer particles with sulfuric acid or phosphoric acid, by addition of sulfuric acid or phosphoric acid to double-bond-containing polymer particles, by decomposition of persulfates or perphosphates in the presence of double-bond-containing polymer particles, as well as by transesterification after polymerization. Furthermore, the —SO$_3$H and —P(O)(OH)$_2$ groups may also be introduced by sulfonation or phosphonation of aromatic vinyl polymers.

Furthermore, ionogenic groups may also be produced by reaction of hydroxyl-modified polymer particles with correspondingly functionalized epoxides.

Besides the cited ionogenic groups, further functional groups for control of the properties may be introduced in particular into the surface of the polymer particles, such as by chemical reaction of the already cross-linked polymer particles with chemicals having reactivity toward C=C double bonds. These reactive chemicals are in particular compounds with which polar groups such as aldehyde, hydroxyl, carboxyl, nitrile, etc., as well as sulfur-containing groups, such as mercapto, dithiocarbamate, polysulfide, xanthogenate and/or dithiophosphoric acid groups and/or unsaturated dicarboxylic acid groups may be chemically bonded to the polymer particles. The goal of modification is in particular to improve the compatibility with a matrix polymer or a matrix-forming polymer material, into which the proton-conducting polymer particles can be incorporated, for example in order to achieve good compatibility during production as well as good coupling.

Particularly preferred methods of modification are grafting of the polymer particles with functional monomers as well as reaction with low molecular weight agents. In this way the ionogenic, proton-donating or proton-accepting monomers may also be incorporated into the polymer particles if necessary.

The starting point for grafting of the polymer particles with functional monomers is expediently the aqueous microgel dispersion, which is reacted with polar monomers such as vinylsulfonic acid, styrenesulfonic acid, acrylic acid, methacrylic acid, itaconic acid, hydroxyethyl(meth)acrylate (in the present Application, the term "(meth)acrylate" includes both methacrylate and acrylate), hydroxypropyl(meth)acrylate, hydroxybutyl(meth)acrylate, acrylonitrile, acrylamide, methacrylamide, acrolein, monomers containing phosphonic acid or phosphoric acid groups and having polymerizable C=C double bonds, such as vinylphosphonic acid, 2-phosphonomethylacrylic acid and 2-phosphonomethylacrylic acid amide, phosphonic acid or phosphoric acid esters of hydroxyfunctional monomers having polymerizable C=C double bonds or salts or derivatives thereof, especially such as partial esters thereof, under the conditions of radical emulsion polymerization. In this way polymer particles having core-shell morphology are obtained. It is desirable that the monomer used in the modification step be grafted as quantitatively as possible onto the unmodified polymer particles or microgel. Expediently, the functional monomers are added before complete cross-linking of the microgels. Modification of double-bond-containing polymer particles, for example by ozonolysis, is also an option.

In a preferred embodiment, the polymer particles, especially the microgels, are modified by hydroxyl groups, especially also at the surface thereof. The hydroxyl group content of the polymer particles, especially of the microgels, is determined according to DIN 53240, as the hydroxyl number in units of mg KOH/g polymer, by reaction with acetic anhydride and titration of the liberated acetic acid with KOH. The hydroxyl number of the polymer particles, especially of the microgels, preferably lies between 0.1 and 100, more preferably between 0.5 and 50 mg KOH/g polymer.

The amount of modification agent used is contingent on its effectiveness and on the requirements applicable to the individual case, and it lies in the range of 0.05 to 30 weight percent relative to the total amount of polymer particles and especially microgel used. A value of 0.5 to 10 weight percent relative to the total amount of polymer particles, especially microgel, is particularly preferred.

The modification reactions may be performed at temperatures of 0 to 180° C., preferably 20 to 95° C., if necessary under a pressure of 1 to 30 bar. The modifications may be carried out on rubber microgels in bulk or in the form of a dispersion thereof, in which case inert organic solvents or even water may be used as the reaction medium. Particularly preferably, the modification is performed in an aqueous dispersion of the cross-linked rubber.

Within the polymer matrixes, such as in the form of membranes, especially polymer electrolyte membranes for fuel cells, the particles containing ionogenic groups and used according to the invention may be present in a proportion of matrix polymer to particles containing ionogenic groups equal to 1:99 to 99:1, preferably 10:90 to 90:10, particularly preferably 20:80 to 80:20. The amount of the particles containing ionogenic groups and used according to the invention depends on the desired properties of the membrane, such as the proton conductivity of the membranes.

According to a preferred embodiment, the present invention relates to a polymer electrolyte membrane for fuel cells, comprising a polymer matrix, in which particles containing ionogenic groups are embedded, which particles have a mean particle diameter in the range of 5 nm to 500 nm (determined by means of ultracentrifugation as explained in the foregoing), which are produced by emulsion polymerization and which contain ionogenic groups selected from the group consisting of: —$SO_3H$, —$OSO_3H$, —$P(O)(OH)_2$, —O—$P(OH)_2$ and —O—$P(O)(OH)_2$ and/or salts thereof and/or derivatives thereof. The preferred groups are —$SO_3H$, —$OSO_3H$, —$P(O)(OH)_2$, —O—$P(O)(OH)_2$ and/or salts thereof and/or derivatives thereof, especially esters, such as partial esters.

The proportion of the said ionogenic groups in the polymer particles containing ionogenic groups preferably lies in the range of 0.1 to 95 wt %, more preferably 1 to 90 wt %, relative to the total amount of polymer particles.

Suitable salts of the polymer particles include metal or ammonium salts, especially alkali metal salts, alkaline earth salts, etc.

Suitable derivatives of the polymer particles include in particular esters and partial esters of the cited ionogenic groups.

When the particles containing ionogenic groups are of oligomeric nature, they preferably do not have a solid phase boundary with the surrounding matrix. The particle size of such oligomers, which may also be referred to as star oligomers, is preferably in a range of approximately 2 nm to approximately 10 nm. These oligomeric particles containing ionogenic groups are preferably produced by polymerization or copolymerization in solution or in bulk.

Regardless of whether the particles containing ionogenic groups are of polymeric or oligomeric nature, the ionogenic groups, especially acid groups, may be present either at the surface, or in other words in the form of a core-shell structure, or in the entire particles.

The particles containing ionogenic groups preferably have a substantially spherical shape (microgel) or a substantially star-like shape, but do not necessarily have to have a solid phase boundary with the surrounding polymer matrix. Thus it is also possible for the particles containing ionogenic groups to have a shape different from a substantially spherical shape or a substantially star-like shape. According to a preferred embodiment, the particles containing ionogenic groups are solid particles, which preferably have a particle size in the nanometer range.

The type of production of the particles containing ionogenic groups is not subject to any particular restriction. For example, the particles containing ionogenic groups may be produced by polymerization or copolymerization in solution or in bulk, by emulsion polymerization or by suspension polymerization. However, the particles containing ionogenic groups are preferably produced by emulsion polymerization, especially when polymer particles containing ionogenic groups are desired.

The polymer matrix comprises at least one basic polymer. If necessary, standard processing aids may be embedded in the polymer matrix. Furthermore, at least one non-basic polymer may also be included in the polymer matrix, for example to influence the thermal or mechanical properties if so desired.

Suitable doping agents for the inventive polymer electrolyte membrane containing the polymer matrix are known to those skilled in the art. Examples are phosphoric acid, phosphoric acid derivatives, phosphonic acid, phosphonic acid derivatives, sulfuric acid, sulfuric acid derivatives, sulfonic acid or sulfonic acid derivatives. Further preferred doping agents are the reaction product of an at least dibasic, inorganic acid with an organic compound, wherein the reaction product contains an unreacted acid group. The degree of doping is preferably between 60 and 95%, particularly preferably between 65 and 90%, relative to the weight of the undoped polymer matrix.

Standard additives used in membranes for fuel cells may be used as processing aids. A person skilled in the pertinent art will be capable of selecting suitable processing aids.

The basic polymers are preferably selected from the group comprising polybenzimidazole, polypyridine, polypyrimidine, polyimidazoles, polybenzthiazoles, polybenzoxazoles, polyoxadiazoles, polyquinoxalines, polythiadiazoles, poly (tetrazapyrenes) or a combination of two or more thereof, polybenzimidazole being particularly preferred. Furthermore, however, other polymers may also be incorporated in the polymer matrix in order to modify the mechanical or thermal properties.

The inventive polymer electrolyte membrane provides excellent proton conductivity in the presence of water, but even in the anhydrous condition it has industrially relevant conductivity.

According to a preferred embodiment, the inventive polymer electrolyte membrane has a conductivity of at least 2.5 S/m at a temperature of 25° C., although a conductivity of at least 3.1 S/m at a temperature of 25° C. is particularly preferred.

Furthermore, there is provided a method for production of a polymer electrolyte membrane for fuel cells, especially according to the present invention and the preferred embodiments described here, which method comprises the following steps:
(a) producing a membrane casting solution, at least comprising a solvent, a matrix-forming basic polymer and particles containing ionogenic groups, as described in the foregoing,
(b) casting the membrane casting solution in the form of a membrane, and
(c) removing the solvent.

According to the invention, the particles containing ionogenic groups are dispersed in step a) in a solution of the matrix-forming basic polymer. Optimal dispersion or homogenization of the particles containing ionogenic groups in a solution of the basic polymer is possible particularly preferably in accordance with WO 2005033186 A1 and WO 2005030843 A1, and it ensures that, according to the invention, the particles containing ionogenic groups do not touch one another in the polymer matrix after step c).

In a further step d), the membrane may be doped with at least one doping agent after step c).

The solvent is not subject to any substantial restriction, as long as the matrix-forming basic polymer and/or the particles containing ionogenic groups can be dissolved or suitably dispersed so as to form the desired membrane. However, the solvent is preferably selected from the group comprising N-methylpyrrolidone (NMP), dimethylformamide (DMF), dimethyl sulfoxide (DMSO), dimethylacetamide (DMAc) and mixtures thereof.

Removal of the solvent is achieved by standard means, although removal by heating the cast membrane casting solution and/or by applying a vacuum is preferred.

Furthermore, there is provided the use, in fuel cells, preferably in high-temperature fuel cells in a temperature range up to approximately 200° C., of the polymer electrolyte membrane defined in the foregoing or of the polymer electrolyte membrane obtainable according to the foregoing method.

The inventive polymer electrolyte membrane may provide excellent proton conductivity for a long time in fuel cells, such as high-temperature fuel cells in a temperature range up to approximately 200° C.

Figure 1:
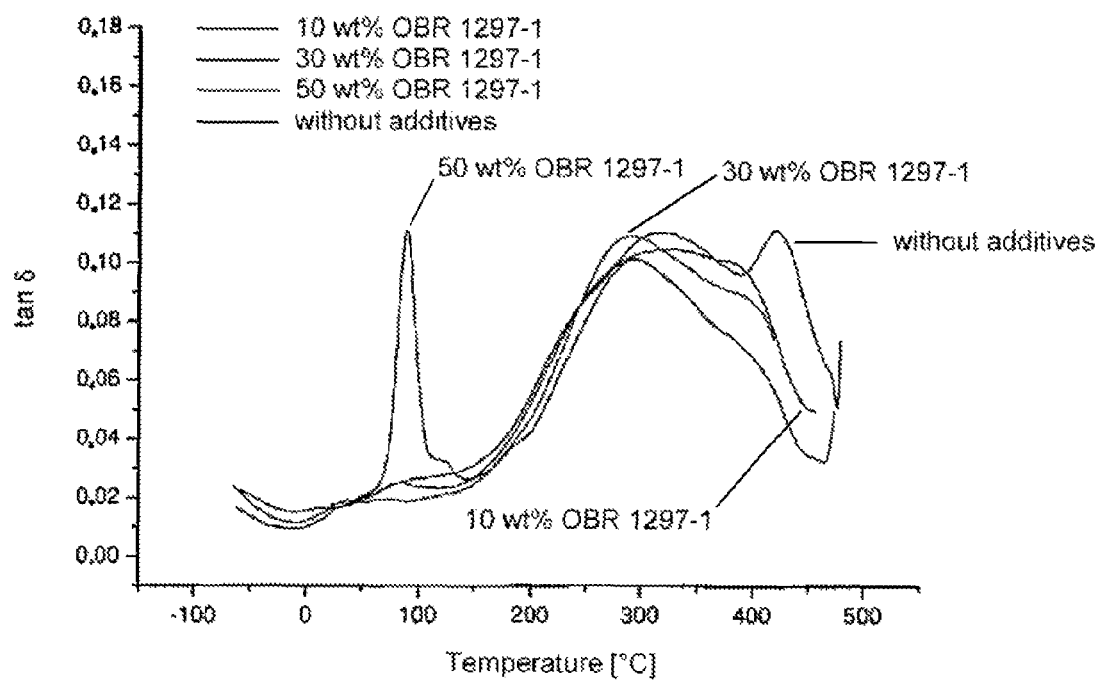
FIG. 1 illustrates DMA measurements related to Example 8 described below.

The following examples are presented in order to explain the present invention in more detail, without limiting the scope of protection of the subject matter claimed in the present invention.

EXAMPLES

Example 1

Examples of Production of Microgels or of Substantially Spherical Polymer Particles Containing Ionogenic Groups The production of microgels that may be used as particles containing ionogenic groups for production of the inventive polymer electrolyte membranes for fuel cells will be described hereinafter.

The microgels are produced by emulsion polymerization. The monomer combinations as well as the main formulation components used for production of the microgels are summarized in Tables 1) and 2). All formulation components are relative to 100 parts by weight of the monomer mixture.

The experiments in which Mersolat® H95 of Lanxess Deutschland GmbH was used as emulsifier are summarized in Table 1). Mersolat® H95 is the sodium salt of a mixture of long-chain (C16-C18) alkylsulfonates.

The experiments in which a mixture of disproportionated resinic acid (Dresinate® 731/70% of Abieta) and fatty acid (Edenor® HTiCT N of Oleo Chemicals/12% in water) was used as emulsifier are summarized in Table 2). In these experiments, 0.6 parts by weight of potassium hydroxide was also added (Table 2)). The mixture of resinic and fatty acid was formally neutralized in a ratio of 150% by the amount of potassium hydroxide.

The following monomers were used for production of the microgels listed in Tables 1) and 2):

Styrene (98%) of KMF Labor Chemie Handels GmbH
Butadiene (99%, destabilized) of Lanxess Deutschland GmbH
Trimethylolpropane trimethacrylate (90%) of Aldrich; Product number: 24684-0 (abbreviation: TMPTMA)
Hydroxyethyl methacrylate (96%) of Acros; Product number: 156330010 (abbreviation: HEMA)
Na vinylsulfonate; 30% aqueous solution of Fluka; Product number: 95061 (abbreviation: NaVS)
Na styrenesulfonate (90%) of Fluka; Product number: 94904 (abbreviation: NaSS)
Vinylphosphonic acid (95%) of Fluka; Product number: 95014 (abbreviation: $H_2VP$)
2-(Methacryloyloxy)ethyl phosphate of Aldrich; Product number: 463337 (abbreviation: $H_2MOOEP$)

with 0.08 g 4-methoxyphenol (Arcos Organics, Article No. 126001000, 99%) into the reaction vessel. After the reaction mixture had been heated to 30-40° C., a freshly produced 4% aqueous premix solution was added. This premix solution consisted of:

0.169 g ethylenediaminetetraacetic acid (Fluka, Article number 03620), 0.135 g iron (II) sulfate.$7H_2O$ (Riedel de Haen, Article number 12354), (calculated without water of crystallization)

0.347 g Rongalit C, Na formaldehyde sulfoxylate 2-hydrate (Merck-Schuchardt, Article number 8.06455) (calculated without water of crystallization) as well as 0.524 g trisodium phosphate.$12H_2O$ (Acros, Article number 206520010) (calculated without water of crystallization).

TABLE 1

Microgel formulations on the basis of Mersolat ® H95 emulsifier

| Microgel designation | Styrene [parts by weight] | Butadiene [parts by weight] | TMPTMA [parts by weight] | NaVS [parts by weight] | $Na_2VP$[1] [parts by weight] | NaSS [parts by weight] | $H_2MOOEP$[2] [parts by weight] | Mersolat ® H95[3] [parts by weight] | Water amount[4] [parts by weight] |
|---|---|---|---|---|---|---|---|---|---|
| OBR 1290-2 | 88.5 | — | 1.5 | 10 | — | — | — | 0.7 | 400 |
| OBR 1290-4 | 88.5 | — | 1.5 | 10 | — | — | — | 4.0 | 400 |
| OBR 1293-1 | 84 | — | 6 | 10 | — | — | — | 2.5 | 400 |
| OBR 1291-1 | 84 | — | 6 | 10 | — | — | — | 1.5 | 400 |
| OBR 1297-1 | 88.5 | — | 1.5 | — | 10 | — | — | 2.5 | 400 |
| OBR 1294-1 | 93.5 | — | 1.5 | — | — | 5 | — | 2.5 | 400 |
| OBR 1361-B | — | 84 | 6 | 10 | — | — | — | 2.5 | 400 |
| OBR 1438-1 | 86.9 | — | 5 | — | — | — | 8.1 | 2.5 | 400 |

[1] $Na_2VP$ was obtained from $H_2VP$ by neutralization in situ with 2 equivalents of NaOH. The weight value is relative to the sodium salt of vinylphosphonic acid ($Na_2VP$)
[2] The weight value of 2-(methacryloyloxy)ethyl phosphate is relative to the free acid ($H_2MOOEP$); before initiation of the polymerization, $H_2MOOEP$ was neutralized by addition of 2 equivalents of KOH, so that the corresponding dipotassium salt ($K_2MOOEP$) was present in the reaction mixture
[3] The amount value is relative to the total amount of Mersolat ® H95 in the reaction mixture
[4] The amount value is relative to the total amount of water in the reaction mixture

TABLE 2

Microgel formulations on the basis of a resinic acid/fatty acid emulsifier system

| Microgel designation | Styrene [parts by weight] | Butadiene [parts by weight] | TMPTMA [parts by weight] | HEMA [parts by weight] | Dresinate ® 731* [parts by weight] | Edenor HTiCT N* [parts by weight] | KOH [parts by weight] | Total water amount [parts by weight] |
|---|---|---|---|---|---|---|---|---|
| OBR 1435-4 | 91 | — | 1.5 | 7.5 | 4.0 | 1.0 | 0.6 | 230 |
| OBR 1327 B | 67 | 22.5 | 3 | 7.5 | 4.0 | 1.0 | 0.6 | 400 |
| OBR 1330 I | 81.5 | 11.5 | 4 | 3.0 | 4.0 | 1.0 | 0.6 | 400 |

*Amount value for 100% material
Dresinate ®: disproportionated resinic acid (Dresinate ® 731/70% of Abieta)
Edenor ® HTiCT N: disproportionated fatty acid of Oleo Chemicals (12% in water)

The products OBR 1290-2, OBR 1290-4, OBR 1293-1, OBR 1291-1, OBR 1297-1, OBR 1294-1 and OBR 1438-1 (Table 1)) were produced in a 6-liter glass reactor with stirring system, whereas the products OBR 1361-B, OBR 1435-4, OBR 1327 B and OBR 1330 I (Table 1) and Table 2)) were produced in a 20-liter steel autoclave with stirring system.

For each emulsion polymerization reaction in the glass reactor, 3.93 kg water was introduced and purged with a stream of nitrogen. Part of the total Mersolat amount was added to the water pool and dissolved. The following amounts were added to the water and dissolved; for the production of OBR 1290-2, 5.3 g Mersolat® H95; for OBR 1291-1, 13.7 g Mersolat® H95; for OBR 1293-1, OBR 1297-1, OBR 1294-1, OBR 1361-B and OBR 1438-1, 24.2 g Mersolat® H95; and for OBR 1290-4, 40.0 g Mersolat® H95. Then 1000 g of the monomer mixtures listed in Table 1) were introduced together For activation of the polymerization, an activator solution of 0.56 g p-menthanehydroperoxide (Trigonox® NT 50 of Akzo-Degussa) in 50 g water and the remaining amount of Mersolat® H95 (2.1 g) was prepared.

Half of the aqueous activator solution was introduced into the reaction vessel 5 minutes after addition of the premix solution. Hereby the polymerization reaction was started. After a reaction time of 2.5 hours, the reaction temperature was raised to 40-50° C. After one further hour, the second half of the aqueous activator solution was added. Once a polymerization conversion of >90% had been reached (usually: 95%-100%), the polymerization was stopped by addition of an aqueous solution of 2.35 g diethylhydroxylamine (DEHA, Aldrich, Article number 03620).

OBR 1361-B, OBR 1327 B and OBR 1330 I were produced by an analogous procedure in a 20-liter autoclave with stirring system. In each case, 3.5 kg of the monomer mixture and a total water amount of 14 kg were used. Thereafter the experiments were performed in a manner analogous to that of the experiments carried out in the glass reactor.

After the polymerization reactions were stopped, unreacted monomers and volatile components were removed from the latex by stripping with steam.

The latices of Tables 1) and 2) were filtered then mixed with stabilizer, coagulated and dried as in Example 2 of U.S. Pat. No. 6,399,706.

The gels were characterized both in the latex condition by means of ultracentrifugation (UZ) and dynamic light scattering (DLS) relative to their particle diameter, and in the solid condition relative to solubility in toluene (gel content, swelling index/QI) and by means of DSC (glass transition temperature/Tg and width of the Tg interval).

Characteristic data of the microgels described in Tables 1) and 2) are compiled in Table 3).

TABLE 3

Characteristic data of the microgels (from Tables 1) and 2))

| Microgel designation | Diameter parameters | | | | Gel content [wt %] | Swelling index | Tg [° C.] | ΔTg [° C.] |
|---|---|---|---|---|---|---|---|---|
| | $d_{10}$ [nm] | $d_{50}$ [nm] | $d_{80}$ [nm] | $d_{DLS}$ [nm] | | | | |
| OBR 1290-2 | 154.9 | 195.8 | 240.2 | — | 99.9 | 5.9 | 112 | 6.4 |
| OBR 1290-4 | — | — | — | 35 | 82.5 | 9.8 | 111 | 7.6 |
| OBR 1293-1 | 27.5 | 39.2 | 47.2 | — | 99.9 | 8.2 | 124.5 | 12.2 |
| OBR 1291-1 | — | — | — | 155 | 99.1 | 4.0 | 120 | 14.2 |
| OBR 1297-1 | — | — | — | 171 | 100.0 | 6.5 | 112 | 6.0 |
| OBR 1294-1 | 63.1 | 78.7 | 88.1 | — | 99.6 | 9.2 | 112 | 8.0 |
| OBR 1361-B | — | — | — | 137 | 95.6 | 5.1 | −78 | 10.4 |
| OBR 1435-4 | — | — | 48.3 | — | 93.1 | 9.4 | 103.5 | 9.8 |
| OBR 1327 B | 30.7 | 40.3 | 46.1 | — | 94.2 | 6.4 | 36 | 21.8 |
| OBR 1330 I | 35.1 | 47.6 | 53.3 | — | 91.2 | 11.3 | 62 | 20 |
| OBR 1438-1 | — | — | — | 250 | 99.9 | 5.4 | 116 | 15.6 |

Meaning of Symbols in Table 3):

$d_{10}$, $d_{50}$ and $d_{80}$: The particle diameter was determined on the stopped and steam-stripped latex by means of ultracentrifugation (W. Scholtan, H. Lange, "Determination of the Particle Size Distribution of Latices with the Ultracentrifuge", Kolloid-Zeitschrift and Zeitschrift für Polymere (1972) Volume 250, No. 8). The latices have a characteristic particle size distribution, which is described by the diameter parameters $d_{10}$, $d_{50}$ and $d_{80}$. These diameter parameters mean that respectively 10 wt % ($d_{10}$), 50 wt % ($d_{50}$) and 80 wt % ($d_{80}$) of the particles have a diameter smaller than the indicated numerical value. The particle size of the microgels in the latex and in the solid products isolated from the latex and as used in the inventive compositions are practically identical.

$d_{dls}$: particle diameter determined on the latex by means of dynamic light scattering (DLS). A Zetasizer® Nano Instrument (model number: Nano ZS) of Malvern Instruments Ltd., Worcestershire, England was used for the determination. A mean particle diameter is obtained by means of dynamic light scattering.

Tg: glass transition temperature
ΔTg: width of the Tg interval

The DSC-2 instrument of Perkin-Elmer was used to determine Tg and ΔTg. In the first measurement cycle, the sample is quickly cooled to −130° C. with liquid nitrogen then heated to 150° C. at a heating rate of 20 K/min. In the second measurement cycle, it is again cooled to −130° C. then heated at 20 K/min. Tg and ΔTg are determined in the second measurement cycle.

The microgels are characterized by the insoluble fraction and by the degree of swelling of the insoluble fraction. The insoluble fraction and the degree of swelling are determined in toluene. For this purpose, 250 mg of the microgel particles is swollen for 24 hours with shaking in 25 mL toluene at 23° C. After centrifugation at 20,000 rpm, the insoluble fraction is separated and dried. The gel content is obtained from the quotient of the weight of the residue dried to constant weight at 70° C. and the initial weight and is reported in weight percent.

QI: Swelling index is defined as the wet weight of the microgel divided by the dry weight of the microgel.

The swelling index is calculated from the weight of the solvent-containing microgel ($MG_{wet}$) swollen in toluene at 23° C. for 24 hours (after centrifugation at 20,000 rpm) and the weight of the dry microgel ($MG_{dry}$).

$$QI = MG_{wet}/MG_{dry}$$

The gel content is calculated as the percentage of the toluene-insoluble microgel ($MG_{dry}$) relative to the initial weight of microgel (250 mg):

$$\text{Gel content } [\%] = 100 \times \frac{MG_{dry}}{250}$$

Example 2

Microgel Dispersion for Production of Polymer Membranes for Fuel Cells

Various acid-group-containing microgels are dispersed in a solution of 16 wt % polybenzimidazole (PBI, product of Sartorius AG) and 84 wt % dimethylacetamide (DMAc, 99%, Aldrich) (Table 4), PBI solution (16%)).

The composition of the dispersion is given in Table 4):

TABLE 4

Composition of the dispersion of microgel, PBI and solvent

| Material | Wt % | Formulation in g |
|---|---|---|
| PBI solution (16%) | 33.33 | 200 |
| DMAc | 54.17 | 325 |
| Microgel (OBR 1294-1, OBR 1297-1 or OBR 1290-4 according to Table 5)) | 12.5 | 75 |
| Total | 100 | 600 |

The following starting materials in the indicated proportions by weight were used for production of the microgels OBR 1294-1, OBR 1297-1 and 1290-4 listed in Tables 5) and 6). The microgels were produced as described in the foregoing in Example 1.

TABLE 5

Formulations for production of the microgels OBR 1294-1 and OBR 1297-1, OBR 1290-4

| Microgel OBR | Styrene [wt %] | TMPTMA [wt %] | NaSS [wt %] | NaVS [wt %] | Na$_2$VP [wt %] |
|---|---|---|---|---|---|
| 1294-1 | 93.5 | 1.5 | 5 | — | — |
| 1297-1 | 88.5 | 1.5 | — | — | 10 |
| 1290-4 | 88.5 | 1.5 | — | 10 | — |

Explanations:
Styrene (98%) of KMF Labor Handels GmbH,
TMPTMA: Trimethylolpropane trimethacrylate (90%) of Aldrich; Product number: 24684-0,
NaSS: Na styrenesulfonate (90%) of Fluka; Product number: 94094,
NaVS: Na vinylsulfonate; 30% aqueous solution of Fluka; Product number: 95061,
Na$_2$VP: Sodium salt of vinylphosphonic acid H$_2$VP (95%) of Fluka; Product number: 95014. Na$_2$VP is obtained from H$_2$VP by neutralization in situ with 2 equivalents of NaOH.

The characteristic data of the gels are summarized in Table 6).

TABLE 6

Properties of OBR 1284-1, OBR 1297-1 and OBR 1290-4

| | Analytical data | | | | |
|---|---|---|---|---|---|
| Microgel | $T_g$/° C. | Gel content/ wt % | QI | Width of $\Delta T_g$/° C. | Sulfuric or phosphoric acid content/% |
| OBR 1294-1 | 112 | 99.6 | 9.2 | 8.0 | 0.70% S |
| OBR 1297-1 | 112 | 100 | 6.5 | 6.0 | 0.24% P |
| OBR 1290-4 | 111 | 82.5 | 9.8 | 7.6 | 0.30% S |

Explanations:
$T_g$ = glass transition temperature
QI = swelling index

The inventive microgel dispersions according to Table 4) were produced by adding 75 g (corresponding to 12.5 wt % according to Table 4)) of microgel to 200 g of 16 percent by weight of PBI solution while stirring by means of a propeller stirrer. Part of the 325 g of dimethylacetamide according to Table 4) was also added if needed for the viscosity of the propeller stirring process.

Thereafter the remaining amount of the 325 g of dimethylacetamide was added. The mixture was allowed to stand for 24 h at room temperature and then further processed with a high-pressure homogenizer (type APV 1000 or APV 2000 of APV Deutschland GmbH (invensys)). The mixture according to Table 4) was introduced into the homogenizer at room temperature and passed through the homogenizer six times at 900 to 1000 bar. Up to 5 bar was needed for transport of the mixture through the homogenizer. The processing temperature was between 40° C. and 70° C.

Example 3

Production of a Membrane Casting Solution with Microgel 1297-1

50 g of a dispersion of microgel 1297-1, PBI and dimethylacetamide according to Table 4) were introduced into 310 g of a 19.1 percent by weight PBI solution in DMAc with stirring. The PBI solid content in the solution was lowered to 15 percent by weight by addition of 55 g of dimethylacetamide (DMAc). The solution was intimately mixed for 0.5 to 1 h at room temperature by means of a PTFE half-moon stirring shaft. Thereafter it was degassed for 1 h at room temperature and 30 mbar. Table 7) lists the compositions of the alternative casting solutions used for membrane production.

TABLE 7

Casting solution components for membrane production

| Microgel type | Amount of microgel dispersion | Amount of PBI solution in DMAc | PBI solid content in DMAc solution | Amount of optionally added DMAc |
|---|---|---|---|---|
| 1290-4 | 50 g | 300 g | 19.2% | 60 g |
| 1297-1 | 50 g | 310 g | 19.1% | 55 g |
| 1297-1 | 150 g | 250 g | 19.1% | — |
| 1297-1 | 150 g | 150 g | 19.1% | — |
| 1294-1 | 40 g | 280 g | 16.8% | 30 g |
| 1294-1 | 65 g | 220 g | 16.8% | 6 g |
| 1294-1 | 120 g | 260 g | 16.8% | — |
| 1294-1 | 140 g | 160 g | 16.8% | — |

Table 8) lists the physical properties of the casting solutions produced according to Example 3 and Table 7):

TABLE 8

Physical properties of the casting solutions

| Microgel type | Microgel proportion* | Viscosity (room temperature) | PBI content | Thickness of wet layer |
|---|---|---|---|---|
| 1290-4 | 10% | 3300 mPas | 15.0% | 300 μm |
| 1297-1 | 10% | 5000 mPas | 15.0% | 300 μm |
| 1297-1 | 30% | 7900 mPas | 14.0% | 300 μm |
| 1297-1 | 50% | 6800 mPas | 12.5% | 300 μm |
| 1294-1 | 10% | 10400 mPas | 14.5% | 340 μm |
| 1294-1 | 20% | 13800 mPas | 14.5% | 340 μm |
| 1294-1 | 30% | 13400 mPas | 14.0% | 340 μm |
| 1294-1 | 50% | 10800 mPas | 12.6% | 340 μm |

*Microgel content in wt % relative to the polybenzimidazole content in % according to Table 8). For a PBI content of 15%, a microgel proportion of 10% corresponds to a proportion by weight of 1.5% microgel in the casting solution.

Example 4

Production of Inventive Polymer Membranes with Polymer Particles Containing Ionogenic Groups By means of a pilot-plant drawing machine, the casting solutions produced according to Example 3 and Table 7) were applied in layer thicknesses of between 300 and 340 μm on a polyester film, and were then dried at 65° C. The membrane was stripped from the backing film and then post-dried for 4 h at 250° C. A polymer membrane devoid of any microgels as precursors for particles containing ionogenic groups was produced as a comparison example by the same method.

Example 5

Tensile Stress Measurements

The mechanical stability of the polymer membranes was evaluated by tensile stress measurements. Membrane samples having a length of 10 cm and a width of 2 cm were clamped in a Z 2.5 measuring machine of Zwick GmbH & Co. and subjected at room temperature to a tensile stress test at a rate of 5 mm/min. An undoped polymer membrane (10% OBR 1294-1*) produced according to Example 4 had a modulus of elasticity of approximately 4700 N/mm$^2$ and higher. In contrast to the pure PBI polymer membrane without polymer particles containing ionogenic groups, it tore at tensile stresses of 125 N/mm$^2$ and an elongation of 4 to 5%. The results are summarized in Table 9).

TABLE 9

Tensile stress measurements on polymer membranes

|  | Max. tensile strength | Elongation | Modulus of elasticity |
|---|---|---|---|
| PBI without microgel | 142 N/mm² | 5% | 5500 N/mm² |
| 10% OBR 1294-1* | 125 N/mm² | 5% | 4700 N/mm² |
| 20% OBR 1294-1* | 117 N/mm² | 4% | 4700 N/mm² |
| 30% OBR 1294-1* | 113 N/mm² | 4% | 4700 N/mm² |
| 50% OBR 1294-1* | 65 N/mm² | 2% | 4000 N/mm² |

*Microgel content in wt % relative to the polybenzimidazole content in % according to Table 8)

Example 6

Doping with Phosphoric Acid

To evaluate the uptake capacity for the doping agent, membrane samples measuring 11.8 cm×13.5 cm were placed in 85 percent by weight phosphoric acid at 130° C. for 30 minutes. The adhering phosphoric acid was then wiped off and the weight gain was determined gravimetrically according to the following formula (see Table 10).

(Doped weight−starting weight)/doped weight× 100=degree of doping[%]

Example 7

Measurement of the Proton Conductivity

To evaluate the proton conductivity, doped and undoped polymer membranes were cut into pieces measuring 4.5 cm×2 cm and the mean thickness was determined by measurement at three points at least, after which they were mounted in a measuring cell. The measuring cell was composed of four electrodes, and the resistance was determined by means of impedance spectroscopy at room temperature with exclusion of atmospheric humidity. Compared with a pure PBI membrane devoid of polymer particles containing ionogenic groups, inventive polymer membranes had a conductivity of ≧2.5 S/m at room temperature after doping. In the undoped condition, polymer membranes having different contents of polymer particles containing ionogenic groups exhibit only very low proton conductivity.

TABLE 10

Conductivity measurement with phosphoric acid-doped membranes

| Polymer membrane | Degree of doping with H₃PO₄ | σ (room temperature) |
|---|---|---|
| Pure PBI | 81 wt % | 3.2 S/m |
| Pure PBI | undoped (0 wt %) | <10⁻⁶ S/m |
| 10% OBR 1290-4* | 87 wt % | 4.0 S/m |
| 10% OBR 1297-1* | 86 wt % | 4.4 S/m |
| 10% OBR 1297-1* | undoped (0 wt %) | 4 × 10⁻⁴ S/m |
| 30% OBR 1297-1* | 86 wt % | 3.5 S/m |
| 30% OBR 1297-1* | undoped (0 wt %) | 3 × 10⁻⁴ S/m |
| 50% OBR 1297-1* | 89 wt % | 3.6 S/m |
| 50% OBR 1297-1* | undoped (0 wt %) | 2 × 10⁻⁴ S/m |
| 10% OBR 1294-1* | 82 wt % | 3.7 S/m |
| 20% OBR 1294-1* | 84 wt % | 3.9 S/m |
| 30% OBR 1294-1* | 79 wt % | 3.1 S/m |
| 50% OBR 1294-1* | 78 wt % | 2.6 S/m |

*Microgel content in wt % relative to the PBI content in % according to Table 8)

Example 8

Measurement of the Dynamic Mechanical Properties

Dynamic mechanical analyses (DMA) on undoped membranes were carried out with a DMA 242 C of the Netsch Gerätebau Co. The measurements were made in tension mode with the following measurement parameters: temperature range −50 to 480° C., heating rate 3 K/min, frequency 1 Hz, proportionality factor 1.1, maximum dynamic force 7.1 N, additional static preload 0 N, amplitude 40 μm. The glass transition temperature was determined on the basis of the maxima of the tan δ curves. Table 11) and FIG. 1 present the results of the measurements. Microgel OBR-1297-1 was used as precursor for production of polymer particles containing ionogenic groups in PBI polymer.

The glass transition temperature determined for pure PBI devoid of polymer particles containing ionogenic groups was 420° C. At this temperature, the free volume within the polymer reached a value that caused large parts of the polymer chains to have mobility and allowed the material properties of the polymer to change from the hard glass condition to the rubber condition. The presence of polymer particles containing ionogenic groups in weight proportions of 10 and 30 percent by weight in the PBI matrix led to lowering of the glass transition temperature to 340 or 295° C. due to the plasticizing effect of the polymer particles. In contrast, a proportion of higher than 50 percent by weight of polymer particles did not lead to any further lowering of the glass transition temperature for the PBI matrix polymer, although at 50 percent by weight a pronounced glass transition of the material from polymer particles containing ionogenic groups was evident at a temperature of 89° C. A possible interpretation of this phenomenon is that the percolation limit of the polymer particles containing ionogenic groups is exceeded when the proportion is higher than 50 percent by weight, and so a continuous phase of mutually touching polymer particles forms, whereas when the proportion of polymer particles containing ionogenic groups is lower than 50 percent by weight (especially lower than 40 wt %), these particles are embedded in the PBI matrix in a condition isolated from one another.

TABLE 11

DMA measurements on inventive polymer membranes

| Polymer membrane | Polymer particles containing ionogenic groups $T_g$ [° C.] | PBI matrix $T_g$ [° C.] |
|---|---|---|
| Only PBI | — | 420° C. |
| 10% OBR 1297-1* | — | 340° C. |
| 30% OBR 1297-1* | — | 295° C. |
| 50% OBR 1297-1* | 89° C. | 295° C. |

*Microgel content in wt % relative to the polybenzimidazole content in % according to Table 8)

Example 9

Production of a Fuel Cell

The membranes produced according to Example 4 were cut into square pieces measuring 104 cm² and combined with commercially available ELAT electrodes of the E-TEK Co., each loaded with 2.0 mg/cm² Pt, measuring 50 cm² and impregnated with 0.68 g phosphoric acid. The membrane-electrode sandwich was pressed between plane-parallel plates for 4 h at 160° C. and 50 bar to form membrane-electrode units. The membrane-electrode units obtained in this way were mounted in a standard arrangement in the test fuel cell of Fuel Cell Technologies, Inc. and sealed with a contact pressure of 15 bar.

Example 10

Determination of the Performance Parameters of the Fuel Cells

The cells according to Example 9 were connected to a standard commercial fuel-cell test bench FCATS Advanced Screener of Hydrogenics Inc. and tested in operating condition at 160° C. and 3 bar (absolute). Table 12) summarizes the performance parameters achieved with dry gases.

TABLE 12

Performance parameters

|  | P at 0.6 V [W/cm$^2$]/ (U$_0$ [V]) at 160° C., 3 bar | H$_2$/air gas flow, mL/min (STP) | H$_2$ permeation in air/nitrogen |
|---|---|---|---|
| Pure PBI | 0.28 W/cm$^2$ (0.79 V) | 914/2900 | 3000/3000 ppm |
| 10% OBR 1294-1 | 0.24 W/cm$^2$ (0.98 V) | 783/2486 | 0/0 ppm |
| 20% OBR 1294-1 | 0.31 W/cm$^2$ (1.02 V) | 783/2486 | 0/0 ppm |
|  | 0.30 W/cm$^2$ (1.03 V) | 914/2900 |  |
| 30% OBR 1294-1 | 0.34 W/cm$^2$ (1.01 V) | 914/2900 | 0/0 ppm |
| 50% OBR 1294-1 | 0.29 W/cm$^2$ (1.00 V) | 783/2486 | 10/3000 ppm |
| 10% OBR 1290-1 | 0.36 W/cm$^2$ (1.05 V) | 1044/3314 | 0/0 ppm |

Explanations:
P at 0.6 V: power at a voltage of 0.6 volt
U$_0$: open-circuit voltage without collection of current Example 11

Determination of the Long-Term Stability of the Fuel Cells

Figure 2:
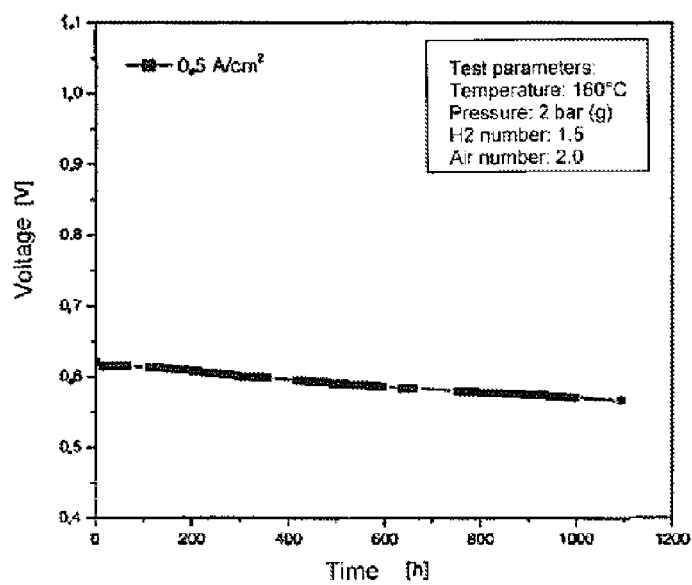
FIG. 2 illustrates the development of voltage versus time at the 0.5 A/cm$^2$ operating point and summarizes the performance parameters achieved with dry gases as described in Example 11 below.

The cell according to Example 9, equipped with a polymer electrolyte membrane containing polymer particles based on OBR 1290-4 (10% relative to the PBI matrix), was connected to a standard commercial fuel-cell test bench FCATS Advanced Screener of Hydrogenics Inc. and tested in operating condition at 160° C. and 3 bar absolute. FIG. 2 illustrates the development of voltage versus time at the 0.5 A/cm$^2$ operating point and summarizes the performance parameters achieved with dry gases. Dry gases having a gas flow of 261 mL/min (at STP) for hydrogen and a gas flow of 829 mL/min (at STP) for air were used. Over an operating time of 1100 h, a membrane-electrode unit based on microgel OBR 1290-4 exhibited a voltage drop of 48 µV/h. A membrane-electrode unit based on pure PBI, wherein the polymer electrolyte membrane was devoid of polymer particles containing ionogenic groups, exhibited an open-circuit voltage of 0.8 V under currentless condition from the very beginning of operation and therefore was not suitable for long-term operation.

We claim:
1. A polymer electrolyte membrane for high temperature fuel cells in a temperature range up to approximately 200° C., comprising a polymer matrix wherein the polymer matrix comprises at least one basic polymer, one or more doping agents, and particles containing ionogenic groups and having a mean particle diameter in the nanometer range, wherein said particles are embedded in the polymer matrix and are distributed homogeneously in the polymer matrix in a concentration of less than 50% relative to the weight of the polymer matrix.

2. A polymer electrolyte membrane according to claim 1, wherein the particles containing ionogenic groups are distributed homogeneously in the polymer matrix in a concentration of less than 40% relative to the weight of the polymer matrix.

3. A polymer electrolyte membrane according to claim 1, wherein the particles containing ionogenic groups are composed mainly of one or more organic polymer(s) and/or oligomer(s).

4. A polymer electrolyte membrane according to claim 1, wherein the particles containing ionogenic groups are composed mainly of a rubber-like polymer or oligomer or of a non-rubber-like polymer or oligomer, wherein the rubber-like polymer is a thermoplastic polymer or oligomer.

5. A polymer electrolyte membrane according to claim 1, wherein the particles containing ionogenic groups have ionogenic groups, wherein the ionogenic groups are covalently bonded acid groups, on the surface or in the entire particles.

6. A polymer electrolyte membrane according to claim 5, wherein the acid groups are carboxylic acid, sulfonic acid and/or phosphoric acid groups.

7. A polymer electrolyte membrane according to claim 1, wherein the particles containing ionogenic groups are organic polymers and/or oligomers produced from at least polystyrene and vinylsulfonic acid.

8. A polymer electrolyte membrane according to claim 1, wherein the particles containing ionogenic groups have a mean particle diameter in a range of 5 nm to 500 nm.

9. A polymer electrolyte membrane according to claim 1, wherein the particles containing ionogenic groups have a substantially spherical or a substantially star-like shape.

10. A polymer electrolyte membrane according to claim 1, wherein the particles containing ionogenic groups are solid particles.

11. A polymer electrolyte membrane according to claim 1, wherein the particles containing ionogenic groups are produced by emulsion polymerization.

12. A polymer electrolyte membrane according to claim 1, wherein the basic polymer or polymers is or are selected from the group comprising polybenzimidazole, polypyridine, polypyrimidine, polyimidazoles, polybenzthiazoles, polybenzoxazoles, polyoxadiazoles, polyquinoxalines, polythiadiazoles, poly(tetrazapyrenes) or a combination of two or more thereof.

13. A polymer electrolyte membrane according to claim 1, wherein the doping agent is selected from the group comprising phosphoric acid, phosphoric acid derivatives, phosphonic acid, phosphonic acid derivatives, sulfuric acid, sulfuric acid derivatives, sulfonic acid, sulfonic acid derivatives or a combination of two or more thereof.

14. A polymer electrolyte membrane according to claim 1, wherein the doping agent is the reaction product of an at least dibasic, inorganic acid with an organic compound, and wherein the reaction product contains an unreacted acid group.

15. A polymer electrolyte membrane according to claim 1, which membrane is substantially anhydrous.

16. A polymer electrolyte membrane according to claim 1, which membrane has a conductivity of at least 2.5 S/m at a temperature of 25° C.

* * * * *